J. M. MICHAELSON.
COMBINED TRANSMISSION AND CHAIN ADJUSTMENT MECHANISM.
APPLICATION FILED JAN. 17, 1908.

913,531.

Patented Feb. 23, 1909.

3 SHEETS—SHEET 1.

J. M. MICHAELSON.
COMBINED TRANSMISSION AND CHAIN ADJUSTMENT MECHANISM.
APPLICATION FILED JAN. 17, 1908.

913,531.

Patented Feb. 23, 1909.

Witnesses

Inventor
Joseph M. Michaelson

UNITED STATES PATENT OFFICE.

JOSEPH M. MICHAELSON, OF MINNEAPOLIS, MINNESOTA.

COMBINED TRANSMISSION AND CHAIN-ADJUSTMENT MECHANISM.

No. 913,531.     Specification of Letters Patent.     Patented Feb. 23, 1909.

Application filed January 17, 1908. Serial No. 411,329.

*To all whom it may concern:*

Be it known that I, JOSEPH M. MICHAELSON, a citizen of the United States, and a resident of Minneapolis, Minnesota, have invented a new and useful Combined Transmission and Chain-Adjustment Mechanism, of which the following is a specification.

My invention relates to transmission mechanism for altering the speed ratio between the motive source and the driven member, and also to mechanism for adjusting the tension of driving chains or belts used in connection therewith; and is adapted for general power transmission purposes, but is more particularly designed for use in connection with motor-cycles and the like.

The object of my invention is to provide a transmission mechanism of two speed type having means for normally maintaining a high speed connection, except when otherwise operated. This mechanism is mounted eccentrically in a cylindrical casing, the head plates of which are adjustably secured thereto and provide a novel means whereby the tension of the chain may be varied.

In attaining the object of my invention, I provide a mechanism of utmost simplicity comprising few and durable parts which may be manufactured and assembled at a comparatively small cost, and which will operate at a high efficiency.

To enable those skilled in the art to clearly understand my invention also to construct or operate the same, a specific embodiment of my invention is set forth in the following specification, the actual scope of my invention being more particularly pointed out in the subjoined claims, reference being had to the accompanying drawings which form a part of this specification.

Figure 1:
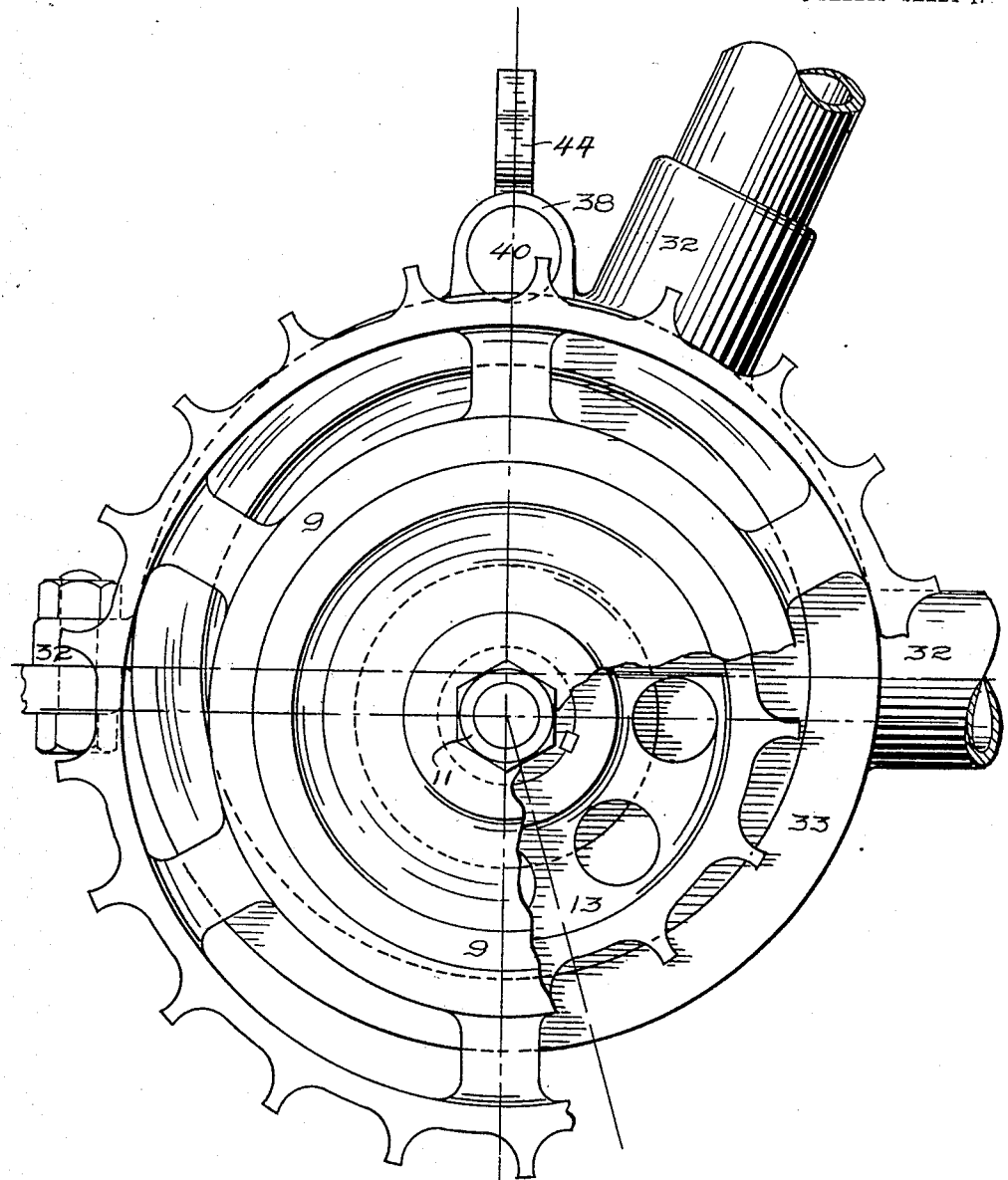
Figure 2:
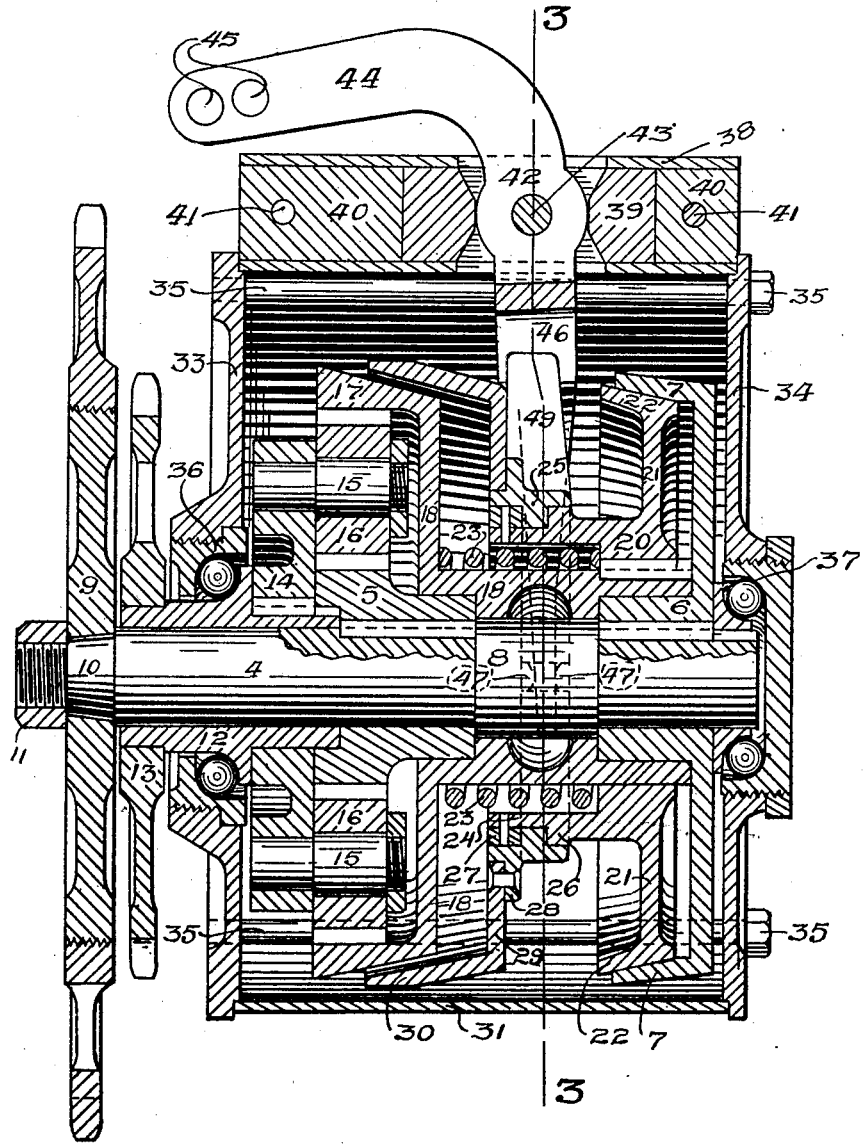
Figure 3:
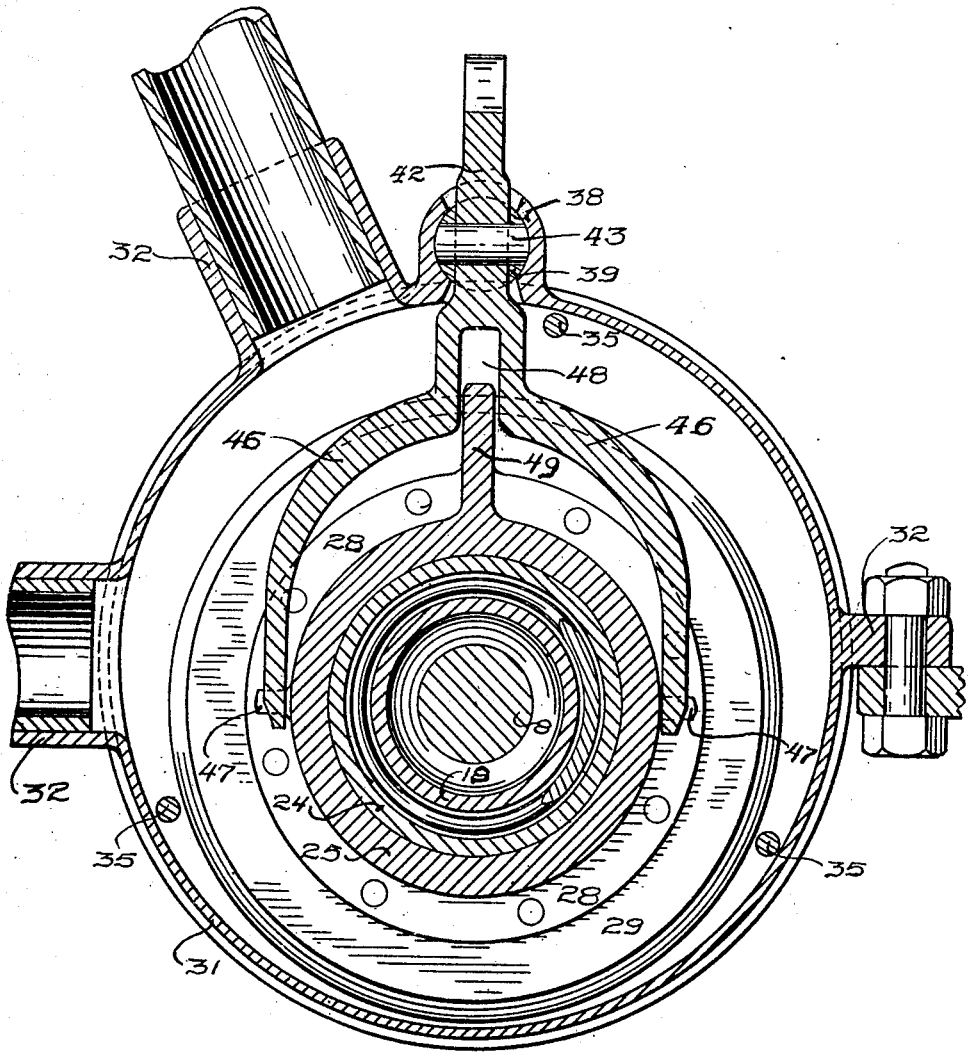

In the drawings, Figure 1 is a side elevation of a combined transmission and chain adjustment mechanism embodying my invention. Fig. 2 is a vertical longitudinal section thereof. Fig. 3 is a vertical cross section thereof, taken on the line 3—3 of Fig. 2.

Referring to the drawings in detail, similar reference numerals refer to similar parts throughout the specification and the several views of the drawings, in which:

The driving member consists of the shaft 4, longitudinally mounted in a cylindrical casing, and carrying a pinion 5 and a clutch member 6, both of which are rigidly keyed upon the driving shaft, said clutch member carrying a flange 7 the inner friction surface of which is conically finished. The driving shaft 4 may be provided with an enlarged portion as 8 to definitely space the pinion gear 5 from the clutch member 6, and receives its rotation from the motive source (not shown) through any suitable means such as a sprocket 9 keyed upon the tapered seat 10 and secured thereto by the nut 11. Said driving shaft also serves, however, to provide a sustaining means for the various members of the transmission mechanism which depend thereon.

In the driven member, the sleeve portion 12 is rotatively mounted upon the shaft 4, to the outer end of which is keyed the sprocket 13 by which power is delivered to any desired point. The gear mount 14 is secured upon the inner end of the sleeve 12 and carries studs 15 upon which the planetary gears 16 are loosely mounted, said planetary gears meshing with the pinion 5.

The internal gear 17 meshes with the planetary gears 16 and is carried by the web 18 of the hub 19 which is rotatively mounted upon the driving member. The clutch member 20 is slidingly mounted upon the hub 19 but keyed to turn therewith, and is provided with a web 21 carrying a clutch flange 22 the outer periphery of which is taperingly finished to the conformity of the flange 7 and is adapted to frictionally engage the same. The spring 23 is mounted over the hub 19 and forces the clutch member 20 to the rightward, Fig. 2, thus tending to normally maintain engagement between the flanges 7 and 22. The sleeve 24 extends from the hub 20 and is journaled within a stationary ring 25 having an inwardly extending flange lying between the shoulder 26 and the detachable ring 27, thus longitudinally securing the clutch member 20 to the ring 25. The ring 25 is also provided with a flange 28 to which is riveted the web 29 of the stationary concentric brake 30 which is adapted for engagement with the tapered periphery of the gear 17.

The cylindrical casing 31 inclosing the transmission mechanism may be provided with bosses 32 or other suitable means by which it may be secured to the frame of a machine upon which my device is to be employed. The head plates 33 and 34 are secured upon the ends of the casing by means of the stay-bolts 35, and are provided with journals 36 and 37 sustaining the transmission mechanism. The journals as herein shown are of an approved ball-bearing type and are slightly offset from the centers of the head plates, thus by loosening the stay-bolts 35 and turning the head plates 33 and 34, the axis of the transmission mechanism and sprockets will describe an arc of a circle about the axis of the cylindrical casing, whereby the tension of a chain mounted upon one of these sprockets may be varied according to the judgment of the operator.

The tubular casing 38 is formed integral with the casing 31, extending longitudinally thereof, and is chambered to receive the oscillating pillow block 39 which is longitudinally retained therein by the cylindrical stops 40 secured within the casing by means of the pins 41. The said pillow block 39 is cored to receive the hub of the operating lever 42 which is pivotally secured therein by the transverse pin 43, there being openings in the casing to correspond with the cored opening in the pillow block. The operating lever 42 comprises a lever portion 44 being laterally pierced, as at 45, by which it may be linked to any suitable operating devices, and a yoke 46 the extreme portions of which operatively engage the lugs 47 of the ring 25 and provide an intermedium by which the clutches of the transmission mechanism may be manipulated. A cleft 48 is provided at the central portion of the yoke to receive the finger 49 which is formed integral with the ring 25 and provides a positive means for restraining the brake member 30 against rotation.

To operate at high speed, the lever 44 is released allowing the spring 23 to force the clutch member 20 into engagement with the clutch member 6, and the clutch member 20 being keyed upon the hub 19 will cause the internal gear 17 to rotate therewith as hereinbefore set forth, thus impelling the driven member at the full speed of the driving member.

To release the transmission mechanism, the lever 44 is slightly raised upwardly drawing the clutch member 20 from engagement with the clutch member 6, thus disengaging the driving member from the driven member, as hereinbefore set forth.

To operate at low speed, the lever 44 is raised upwardly until the non-rotatable, concentric brake flange 30 engages the periphery of the gear 17, retaining the same in a stationary position, the planetary gears 16 meshing with the internal gear 17 and the driving pinion 5 will differentiate between the two, thus impelling the driven member in the same direction as the driving member but at a reduced speed.

To adjust the tension of a chain or belt, driving or driven by this mechanism, the stay-bolts 35 are loosened, the head plates 33 and 34 being thus released are then turned until a suitable tension of the chain or belt is attained, the stay-bolts are then tightened securing the head plates in position. It should be noted, however, that throughout the above operation, the oscillatory function of the pillow block 39 allows the operating member 42 to adapt itself to any position assumed by the transmission mechanism.

Having thus described my invention, what I claim and desire to secure by Letters Patent, is the following:

1. The combination with an inclosed cylindrical casing of a driving member and a driven member eccentrically mounted in said casing, a variable speed transmission mechanism coacting between said driving and driven members, and an operating lever universally mounted in said casing and adapted to manipulate said speed changing devices, substantially as set forth.

2. The combination of a cylindrical casing, head plates secured thereto, a transmission mechanism eccentrically and adjustably mounted within said casing, an oscillating pillow block journaled in a secondary cylindrical portion 38 of said casing, and an operating member pivotally secured in said pillow block and adapted to manipulate the transmission mechanism, substantially as set forth.

3. The combination of a cylindrical casing, head plates adjustably secured thereto, a two speed transmission mechanism eccentrically mounted within said casing and sustained by the head plates, means for normally maintaining a high speed connection in the transmission mechanism, and an operating member universally mounted in the casing and adapted to manipulate the transmission mechanism, substantially as set forth.

4. The combination of a cylindrical casing, head plates secured thereto, a variable speed transmission mechanism eccentrically mounted within said casing, a secondary cylindrical portion formed integral with said cylindrical casing, a pillow block journaled in said secondary cylindrical portion, an operating member mounted in said pillow block adapted to manipulate said transmission mechanism, and means for normally maintaining a high speed connection of said transmission mechanism except when otherwise operated, substantially as set forth.

5. The combination of an inclosed cylindrical casing, a driving member eccentrically mounted in said casing, a driven member loosely mounted upon said driving member, a variable speed transmission mechanism adapted to effect a direct or a differential engagement between the driving and driven members, an operating lever universally mounted in said casing adapted to manipulate said transmission mechanism, and means for causing said transmission mechanism to maintain a direct connection between said driving and driven members except when otherwise operated, substantially as set forth.

6. The combination of a cylindrical casing, head plates adjustably secured thereto, a driving shaft eccentrically mounted in said head plates, a driven sleeve loosely mounted upon said driving shaft, a pinion secured upon said driving shaft, planetary pinions loosely carried by said driven member and meshing with said driving pinion, an intermediate member provided with an annular rack engaging said planetary pinions, an operating lever universally mounted in said casing, means for interlocking said driving and intermediate members, and means for locking said intermediate member in a fixed position, both of said means being actuated by said operating lever, substantially as set forth.

JOSEPH M. MICHAELSON.

Witnesses:
H. H. HAMMER,
N. W. GILMORE.